May 7, 1929.  O. ZIMMERMANN  1,712,242
SELF BASTING AND TURNING ROASTER
Filed Jan. 16, 1928
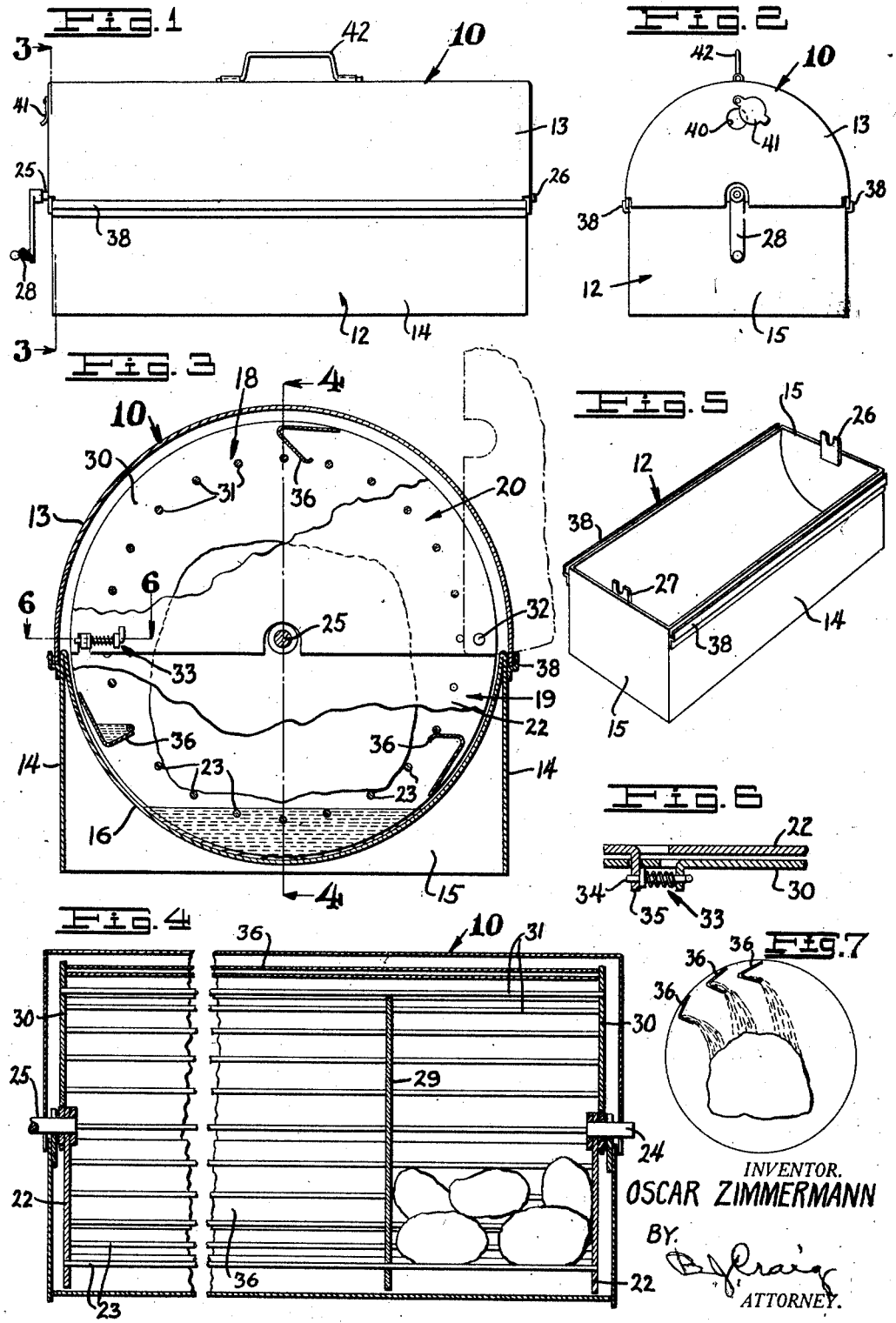
INVENTOR.
OSCAR ZIMMERMANN
BY
B. J. Craig
ATTORNEY.

Patented May 7, 1929.

1,712,242

UNITED STATES PATENT OFFICE.

OSCAR ZIMMERMANN, OF LOS ANGELES, CALIFORNIA.

SELF BASTING AND TURNING ROASTER.

Application filed January 16, 1928. Serial No. 247,081.

This invention relates to improvements in roasters.

The general object of this invention is to provide an improved roaster wherein means is provided whereby the article being cooked may be turned over and basted without removing the cover of the roaster.

Another object of this invention is to provide an improved roaster which may be used successfully either in an oven or over an open flame.

Other objects and advantages of this invention will be apparent from the following description taken in connection with the accompanying drawings wherein:

Fig. 1 is a side view of my improved roaster.

Fig. 2 is a view of the operating end of the roaster.

Fig. 3 is an enlarged section taken on line 3—3 of Fig. 1.

Fig. 4 is a fragmentary longitudinal section through the roaster taken on line 4—4 of Fig. 3.

Fig. 5 is a perspective view of the bottom section of the roaster.

Fig. 6 is an enlarged section of the latch mechanism taken on line 6—6 of Fig. 3, and Fig. 7 is a diagrammatic view showing how the roast is basted.

The practical impossibility of obtaining a juicy tender and crispy roast without using the old wearisome, but approved method, led me to the invention of a new roaster which retains all the savory contents of the meat.

To be able to point out more clearly the advantages of my invention I will describe the present procedure and point out its disadvantages.

The spiced meat is placed on a rack in a pan with a snug fitted lid and with vent and grooves for self-basting. The vapor, condensed on the grooves of the lid, drips down on the meat and washes away all the precious savory exudations of the meat with the spices and salt put on its surface. This vapor itself is not a savory greasy juice but a simple, tasteless, greaseless vapor, which does not create an improvement in the roast but actually destroys valuable properties in that it separates the meat from its valuable juice and carries it down to the bottom of the pan, where it dries to a salty sharp sediment never useable for basting the roast because the rack hinders even the application of the old method, the basting with a common spoon.

The general opinion that with these old roasters there is no shrinkage and no waste, is only true in so far as the shrinkage does not escape out of the pan, but remains as a useless dry sediment, never enriching the qualities of the roast.

In this method, while this self-basting deteriorates the qualities of the roast, the rack hinders the basting with a spoon. The essential rules for roasting are, prevent burning, turn as often as possible, open the oven as little as possible but baste it as often as possible with the juice from the bottom of the pan. To finally obtain a golden brown color and delicious crispness, the pan should be then vented and thereafter never opened until the roast is served. The need to baste the roast at this critical last stage cannot be secured with the old style roasters and hinders the production of a first class product.

The following description and drawing show distinctly how my invention will satisfy all, even the last mentioned requirements, in an ideal way and how it changes the wearysome and sometimes dangerous manipulations into quick and very pleasant ones.

I will now describe one embodiment of my invention by which the desired results may be obtained.

Referring to the drawings by reference characters I have indicated one embodiment of my improved roaster generally at 10. This roaster includes a bottom section 12 as shown in detail in Fig. 5 and a cover 13. The bottom section 12 comprises side walls 14, end walls 15 and a rounded bottom 16 as clearly shown in Fig. 3. Within the bottom section 12 I provide a holder 18 which is of cylindrical shape and includes two sections 19 and 20.

The section 19 includes end members 22 connected together by rods 23 and having trunnions 24 and 25 projecting outwardly therefrom. The trunnion 24 is adapted to be supported by a bearing 26 on one of the end walls 15 and the trunnion 25 is adapted to be supported by a similar bearing 27 on the front end wall 15. The trunnion 25 extends beyond the front wall 15 and is provided with a crank 28.

Some cooks are accustomed to prepare their potatoes along with the roast. To prevent mashing of the potatoes by the weight of the roast I may provide a transverse partition 29 which divides the holder 18 into a meat holding compartment and a potato holding compartment. The potatoes can thus be basted as the roast is basted.

The section 20 of the holder 18 is similar to the section 19 and includes end members 30 connected together by rods 31. The end members 30 of the section 20 overlap the end members 22 of the section 19 and are pivoted to the end members 22 as at 32.

For securing the two sections 19 and 20 together I provide a latch mechanism as indicated at 33. Any desired form of latch mechanism may be used, but as shown in detail in Fig. 6 the latch mechanism which I have used comprises a spring pressed plunger 34 mounted on the end member 30 and adapted to engage an apertured lug 35 of the end member 22.

Secured to the end members 22 and 30 of the top and bottom sections 19 and 20 I provide a plurality of longitudinally extending troughs 36, the inclination of the outwardly projecting portion of each being different so that the point of discharge will be different for each trough and thus the roast will be basted on all sides.

The lower edges of the sides of the cover 13 are adapted to be positioned in channelways 38 secured to the sides 14 of the bottom section 12 while the ends of the cover are adapted to overlap the end walls 15. A vent 40 is preferably provided in one of the end walls of the cover and a pivoted closure plate 41 is provided for the vent. A suitable handle is preferably provided on the cover 13 as shown at 42.

When one desires to roast a piece of meat in my improved roaster the cover 13 is removed, the section 20 unlatched from the section 19 and swung open as indicated by the dotted lines in Fig. 3. The meat is then placed in the section 19, the section 20 closed and latched to the section 19, the cover 13 positioned on the bottom 12 and the roaster either put in an oven or set over an open flame.

Another remarkable advantage is the fact that my roaster can be put over the open flame just as well as in the oven, because means are provided to lead these flames around the roaster, not restricting them to the bottom of the pan only. It will be seen that when the roaster 10 is set over an open flame the shape of the concave bottom 16 and the side walls 14 of the roaster form a heat chamber in which a steady heat is maintained with but little fire and as the piece of meat does not contact with the bottom 16 but rests on either the rods 23 or 31 it will not burn and stick to the bottom of the roaster.

It is a well known fact that to obtain the best results the meat must be basted during cooking either by removing the cover and pouring the juices over the meat with a spoon or automatically by some form of an improved self-basting roasting pan. Also the meat must be turned occasionally to roast the meat evenly on all sides.

With my improved roaster the basting and turning of the meat are done at the same time and without removing the cover by simply turning the crank 28. Upon turning the crank the meat container 18 is rotated which in so doing turns the meat over and at the same time the troughs 36 pass through and pick up some of the juice in the bottom of the roaster, convey it up over the piece of meat and then discharges the juice over the top of the meat.

The turning of a crank, outside on the pan, without removing the pan from the oven, or lifting its lid, turns and bastes the roast in an ideal quick and pleasant way so that each housewife is inclined to turn this crank oftener than is absolutely necessary, surely not to the disadvantage of the quality of the roast.

By having the angle of each of the centerwardly projecting portions of the troughs 36 different each of the troughs will discharge the juice over the meat at a different point and thus evenly baste the meat as shown in Fig. 7.

Another advantage is that my invention prevents the drying off of the juice on the bottom of the pan, because it scrapes every particle and empties them over the meat in a flow lengthwise of the pan. The final crispness is furthered by the ability to keep the pan closed without preventing turning and basting the roast at the same time thoroughly. This fulfills a necessity which the old method failed to do.

Further, there is no piercing of the roast by fork or rod so that the juice remains where it should, in the roast.

As the holder 18 is turned the potatoes will also be turned around and basted in the same manner as the meat, thus cooking the potatoes evenly on all sides and seasoning them with the juice from the meat.

It will be apparent that with my improved roaster it is possible to roast a piece of meat without ever removing the cover while the meat is cooking which as is well known will produce a much more savory and better cooked roast.

Having thus described my invention, I claim:

1. In a roaster, a bottom section, said bottom section including substantially vertical side walls and a semi-cylindrical bottom wall arranged between said side walls, a cover for said bottom section, a holder adapted to be positioned in said bottom section, said holder including two sections, each of said holder sections including end plates connected by a plurality of longitudinally extending rods, longitudinally extending troughs on said holder, the discharge side of said troughs having different angles of inclination, said troughs being mounted to pass close to said bottom of said bottom section, latch means on said end plates adapted to releasably secure said two holder sections together, trunnions on said holder and bearings on said bottom section adapted to support said trunnions, one of said trunnions projecting beyond said cover when said cover is in an operative position and a handle on said trunnion whereby said holder may be rotated.

2. In a roaster including a bottom and a cover for said bottom, a holder adapted to be positioned in said bottom, said holder including two sections adapted to fit together, each of said holder sections including end plates connected by a plurality of longitudinally extending rods and longitudinally extending troughs, latch means on said end plates adapted to releasably secure said two holder sections together, a transverse partition in said holder adapted to form a plurality of compartments in said holder, said partition being supported by one of said holder sections, means to rotatably mount said holder on said bottom, and means to rotate said holder.

3. In a roaster including a bottom and a cover for said bottom, a holder adapted to be positioned in said bottom, said holder including two sections adapted to fit together, said holder sections including end plates connected by a plurality of longitudinally extending rods arranged in cylindrical shape and a plurality of longitudinally extending troughs disposed on said holder sections said troughs being located outside of said rods and within the periphery of said end plates.

4. In a culinary appliance, a bottom including a semi-cylindrical portion, a cover for said bottom, a holder adapted to be positioned in said bottom, said holder including two sections, said holder sections including end plates connected by a plurality longitudinally extending rods arranged in cylindrical form, said end plates of said sections being hinged together adjacent one side, longitudinally extending troughs in said holder, the inclination of said troughs being different relative to each other, latch means on said end plates opposite said hinge adapted to releasably secure two holder sections together, trunnions on said holder and bearings on said bottom adapted to support said trunnions, one of said trunnions projecting beyond said cover when said cover is in an operative position and a handle on said trunnion whereby said holder may be rotated.

In testimony whereof, I hereunto affix my signature.

OSCAR ZIMMERMANN.